(12) United States Patent
Goshen et al.

(10) Patent No.: US 12,032,717 B2
(45) Date of Patent: Jul. 9, 2024

(54) MASKING PERSONAL INFORMATION IN AUDIO RECORDINGS

(71) Applicant: EMC IP Holding Company LLC, Hopkinton, MA (US)

(72) Inventors: Idan Richman Goshen, Beer Sheva (IL); Avitan Gefen, Lehavim (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 216 days.

(21) Appl. No.: 16/832,976

(22) Filed: Mar. 27, 2020

(65) Prior Publication Data

US 2021/0303724 A1 Sep. 30, 2021

(51) Int. Cl.
| | |
|---|---|
| *G06F 21/62* | (2013.01) |
| *G06N 20/00* | (2019.01) |
| *G10L 15/06* | (2013.01) |
| *G10L 15/197* | (2013.01) |
| *G10L 15/26* | (2006.01) |

(52) U.S. Cl.
CPC ......... *G06F 21/6245* (2013.01); *G06N 20/00* (2019.01); *G10L 15/063* (2013.01); *G10L 15/197* (2013.01); *G10L 15/26* (2013.01)

(58) Field of Classification Search
CPC ... G06F 21/6245; G06N 20/00; G10L 15/063; G10L 15/197; G10L 15/26
See application file for complete search history.

(56) References Cited

U.S. PATENT DOCUMENTS

| | | | | |
|---|---|---|---|---|
| 2008/0208579 | A1* | 8/2008 | Weiss | H04M 3/493 704/244 |
| 2013/0266127 | A1* | 10/2013 | Schachter | H04M 3/5175 379/88.01 |
| 2019/0013038 | A1* | 1/2019 | Thomson | G06F 40/20 |
| 2019/0332658 | A1* | 10/2019 | Heckel | G06N 3/0481 |
| 2020/0125746 | A1* | 4/2020 | Joshi | G06F 21/6245 |
| 2020/0342860 | A1* | 10/2020 | Ju | G10L 21/028 |
| 2021/0124800 | A1* | 4/2021 | Williams | G06F 40/205 |
| 2022/0122628 | A1* | 4/2022 | McCloskey | H04M 3/5183 |

FOREIGN PATENT DOCUMENTS

JP    3725470 B2 * 12/2005

OTHER PUBLICATIONS

JP3725470B2—translation (Year: 2005).*
Bartoli et al. "*Automatic Generation of Regular Expressions from Examples with Genetic Programming,*" GECCO '12 Companion, pp. 1477-1478, Jul. 7-11, 2012, Philadelphia, PA, USA. ACM 978-1-4503-1178-6/12/07.

* cited by examiner

*Primary Examiner* — Bhavesh M Mehta
*Assistant Examiner* — Darioush Agahi
(74) *Attorney, Agent, or Firm* — Workman Nydegger

(57) ABSTRACT

One example method includes transcribing a portion of the audio component to create a transcription file that includes text, searching the text of the transcription file and identifying information in the text that may include personal information, defining a textual window that includes the information, evaluating the text in the textual window to identify personal information, and masking the personal information in the audio component of the recording. The personal information may be masked with information of a non-personal nature.

20 Claims, 5 Drawing Sheets

US 12,032,717 B2

MASKING PERSONAL INFORMATION IN AUDIO RECORDINGS

FIELD OF THE INVENTION

Embodiments of the present invention generally relate to the processing of audio recordings. More particularly, at least some embodiments of the invention relate to systems, hardware, software, computer-readable media, and methods for masking selected portions of audio recordings.

BACKGROUND

The security of personal data has become increasingly important. For example, the mutually agreed General Data Protection Regulation (GDPR) came into force on May 25, 2018 and was designed to modernize laws that protect the personal information of individuals. The GDPR include eight rights for individuals. These include allowing people to have easier access to the data companies hold about them, a new fines regime and a clear responsibility for organizations to obtain the consent of people they collect information about. Companies covered by the GDPR are accountable for their handling of the personal information of individuals. For companies that have more than 250 employees, there is a requirement to have documentation of why personal information is being collected and processed, descriptions of the information that is being retained, how long the information is being retained, and descriptions of technical security measures in place. The personal information may come from a variety of sources.

For example, phone call recordings can potentially hold a considerable amount of personal information and may be protected under the GDPR laws. Further, recording systems may be agnostic to the content of the data that they record, which may include personal information. However, protecting this personal information from unauthorized access or disclosure may be difficult.

One factor that contributes to the difficulty in protecting personal information is that personal information is dynamic. There are many types of personal information, and new types can appear. For example, new personal information that may be created includes mail addresses, and online service identifiers such as Facebook or Twitter handles. As other digital platforms come online, still more personal information may be created. While there is a recognized need to protect this personal information in some way, known approaches, particularly those with manual components, have not proven effective.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
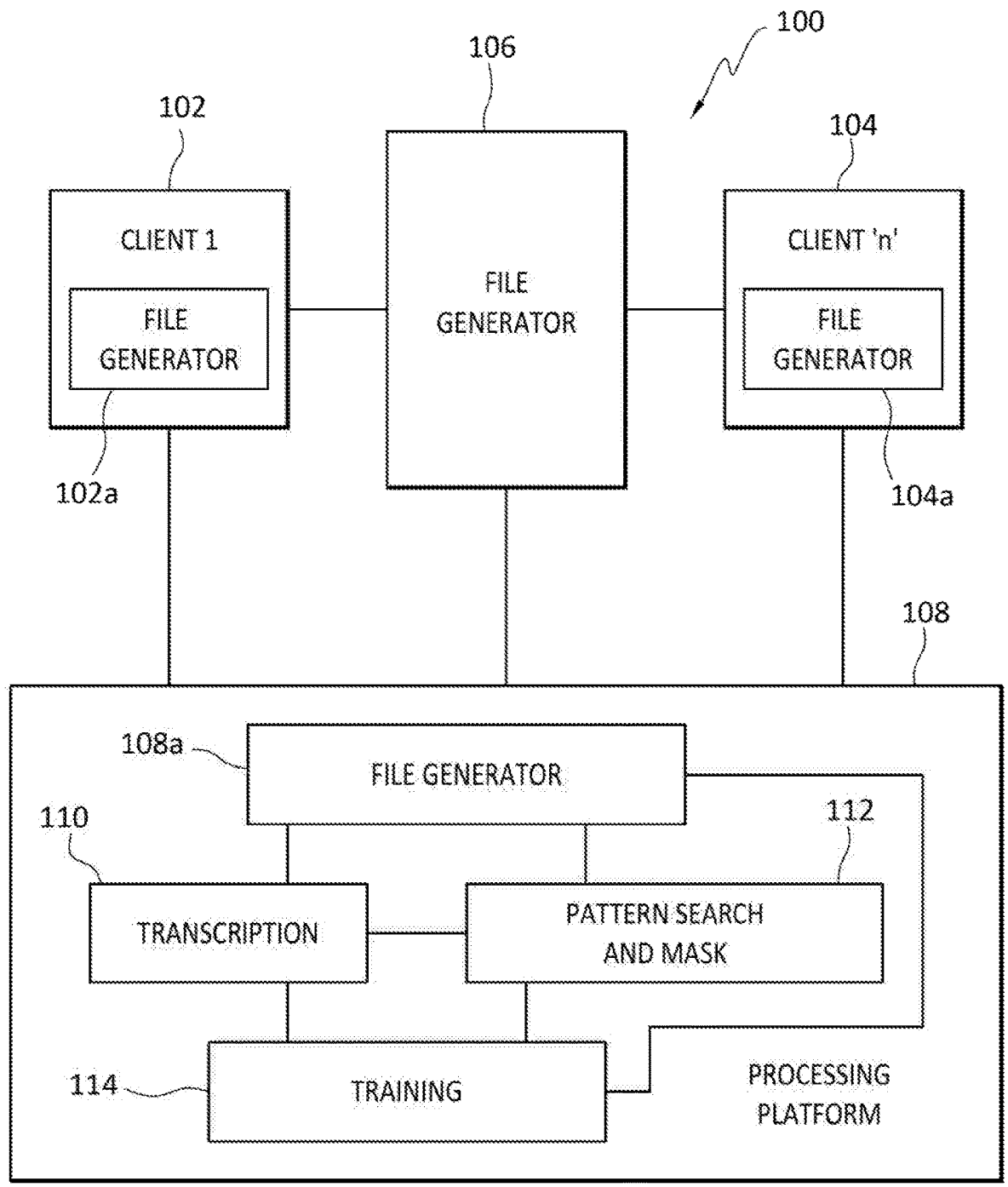
FIG. 1 discloses aspects of an example operating environment.

Embodiments of the present invention generally relate to data backup and restore processes. More particularly, at least some embodiments of the invention relate to systems, hardware, software, computer-readable media, and methods for masking selected portions of audio recordings. For example, embodiments of the invention may enable the masking of personal information in audio recordings, such as recordings made of phone calls, for example.

In some embodiments, an audio file may be created that comprises a recording of one or more persons speaking, or otherwise conveying and/or receiving information, such as by entering a PIN for example. The audio file, which need not be of any particular format, is then transcribed, into a digital form such as Word format or plaintext for example, and timestamps kept for each word or other segment of the transcription. The transcription file may then be searched using one or more learned Regular Expressions (regex) to identify areas that may contain personal information which may, or may not, be personal information of those whose voice(s) have been recorded. A machine learning (ML) classifier may then be run on any areas identified by the regex procedure to classify, such as by inference, whether or not the areas identified by the regex procedure include a personal information window. For any textual window a ° that the ML classifier has classified as personal, that textual window may be masked by replacing the corresponding area in the original audio file with white noise, or performing any other method that will make the personal information unrecognizable by human or machine. Because the white noise may replace the personal information, that personal information may not be able to be reconstructed or recovered.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that personal information in an audio file may be protected from access. In one embodiment, the personal information may be protected even if the personal information does not pertain to any participant whose voice is part of the audio file. In one embodiment, the personal information may comprise, or consist of, information rendered in other than a spoken form. Another advantage of an embodiment is that the personal information in an audio file is rendered unrecoverable, and thus protected, by writing over the personal information. A further advantage of some embodiments is that non-personal information in an audio file may be preserved, while personal information is rendered unrecoverable. An embodiment of the invention may avoid the need for manual transcription and analysis of an audio file. An embodiment of the invention may be implemented in connection with any file or file type that includes an audio component, such as a video file for example that includes both audio and video components. An embodiment of the invention may enable audio of an audio file to be transcribed, and masked, on-the-fly as an associated conversation, for example, proceeds.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, the disclosed operations. Such operations may include, but are not limited to, audio recording operations, audio video recording operations, audio file creation and modification operations, video file generation and modification operations, audio file and video file storage operations, masking operations, training operations, machine learning (ML) operations, audio transcription operations, audio file and video file analysis operations, and one-way, two-way, or n-way, communications comprising audio and/or video components. More generally however, the scope of the invention embraces any operating environment in which the disclosed concepts may be useful.

As used herein, the term 'data' is intended to be broad in scope and includes, but is not limited to, audio files, audio-video (AV) files, transcriptions of audio files, transcriptions of AV files, training data, masking data, regexes, and any file or file type that does, or could, include personal information. Such data can take any of a variety of different forms including, but not limited to, data chunks, data blocks, atomic data, emails, objects of any type, files of any type including media files, word processing files, spreadsheet files, and database files, as well as contacts, directories, sub-directories, volumes, and any group of one or more of the foregoing.

The term 'personal information' is intended to be broad in scope and includes, but is not limited to, any information that may be unique, in one or more respects, to a particular entity, such as a particular human for example, a computing entity, or a group of entities. Such personal information may, or may not, comprise information descriptive of a characteristic personal to a human, such as a physical characteristic. Other examples of personal information include, but are not limited to, a personal identification number (PIN), login credentials, username, passwords, financial information such as bank account numbers and other account numbers, address, phone number, location, and medical information.

With particular attention now to FIG. 1, one example of an operating environment for embodiments of the invention is denoted generally at 100. In general, the operating environment 100 may include any number 'n' of clients 102 and 104. The clients may be any entity capable, whether directly or indirectly, of generating audio data. Thus, a client such as client 102 and 104 may be a human, a computing entity configured to communicate using a computer-generated voice, any computing entity capable of recording audio input, or a combination that includes a human using a computing entity. In some embodiments, a file generator 106 may be configured to record audio communications between clients such as clients 102 and 104. For example, a client 102 that is a human user such as a banking customer may communicate with a client 104 who is a bank customer service representative, and the file generator 106 may generate an audio file that comprises a recording of a conversation between the clients 102 and the clients 104. In another example, the client 104 may be an audio recording device on which the client 102 has left an audio message. In some embodiments, the audio file is a .WAV file, but the scope of the invention is not limited to that particular file type.

More generally, any file type that comprises, or consists of, an audio component may be generated by a file generator such as the file generator 102a, 104a and 106. Such files may be digital or analog. Video files such as .aiff, .MPG, .MP4, and .WMV, for example, that include an audio component may additionally, or alternatively, be generated by a file generator. As well, a file with an audio component may be generated by conversion of another file format. Thus, for example, a file with an audio component may be generated by conversion of an audio file in tape format to a .WAV file. Finally, one or more of the clients 102 and 104 may additionally, or alternatively, be associated with a respective file generator instances 102a and 104a. In some embodiments, there may only be a single client, such as client 102 for example.

As further disclosed in FIG. 1, a processing platform 108 may be provided that may include various components for processing recorded audio information. In some embodiments, the processing platform 108 may comprise an instance of a file generator 108a. The file generator 108a may be provided in addition, or as an alternative, to one or more of the file generators 102a, 104a, and 106. As such, depending upon the embodiment, files with an audio component may be generated by a variety of different entities. The processing platform 108 may communicate, such as by way of a network for example, with any one or more of client 102, client 104, and file generator 106. The processing platform 108 may further comprise a module 110 to transcribe audio components of files, a module 112 to perform pattern searching and masking, and a module 114 to perform training operations.

The operating environment 100 may reside in whole, or in part, at a premises of a business enterprise. In some embodiments, the processing platform 108 may reside in a cloud computing environment. In some embodiments, the client 102 and/or client 104 may reside at a business enterprise or residence. However, no particular configuration of the example operating environment 100 is required.

B. Processing Platform—Training Module

B.1 Training Data

Figure 2:
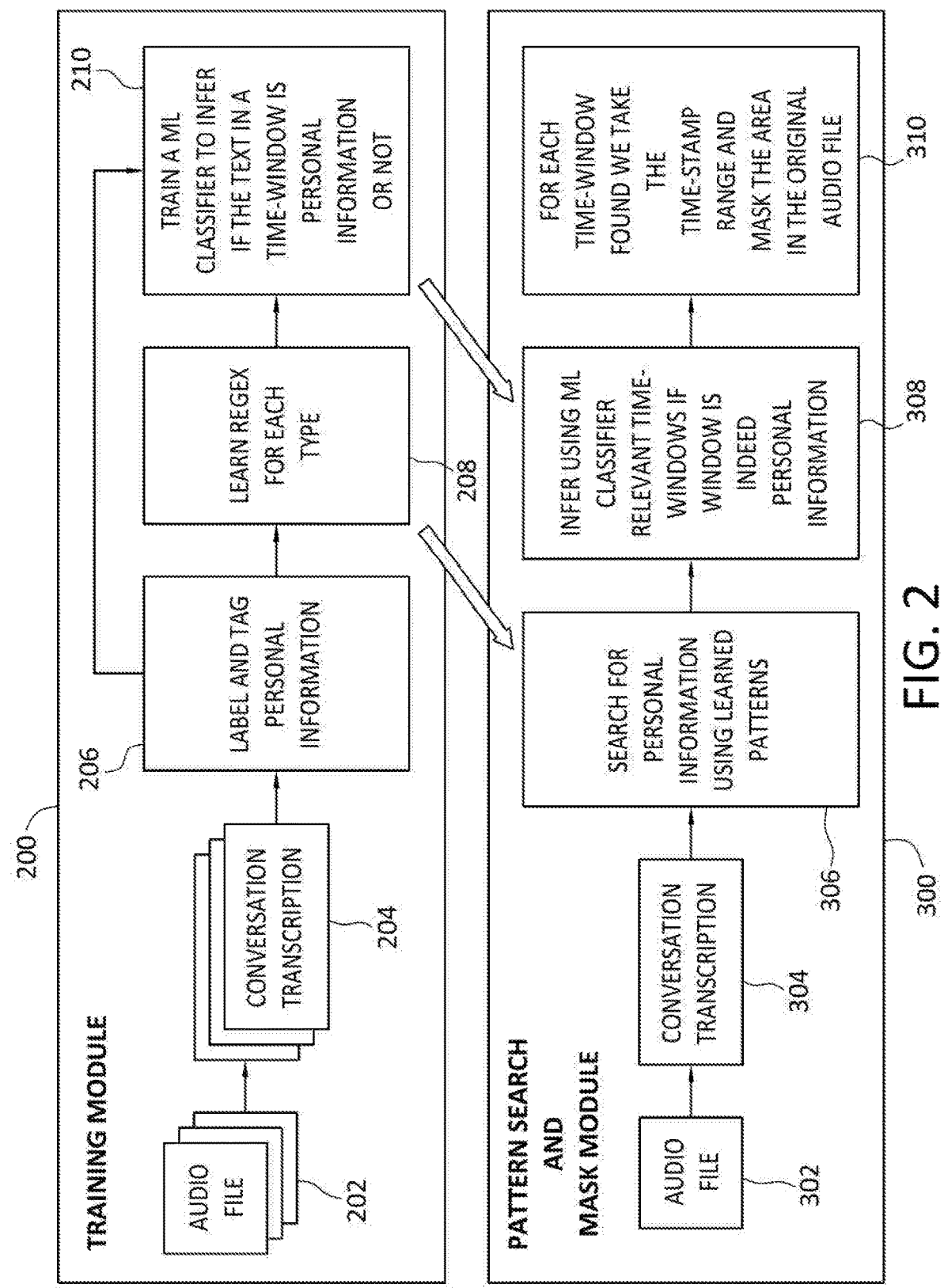
FIG. 2 discloses aspects of an example training module and pattern search and mask module.

With continued reference to FIG. 1, and turning now to FIG. 2 as well, details are provided concerning aspects of an example training module 200, another example of which is denoted at 114 in FIG. 1. As indicated in FIG. 2, the training module 200 may implement a variety of functions with regard to one or more files 202 that comprise respective audio components. Particularly, such functions may be performed in connection with respective transcriptions 204 of the files 202.

In some embodiments, there may be a need to generate training data that may be used to improve the effectiveness of operations performed by a pattern search and mask module 300, an embodiment of which is discussed elsewhere herein. The generation of training data may be implemented in various ways, and the scope of the invention is not limited to the illustrative approaches disclosed herein.

In some embodiments, training data may be generated by the training module 200 based on a set of files 202. The files 202 may be chosen based on their relevance. For example, if training is to be performed to enable identification and masking of patient medical information, a set of audio files 202 concerning financial information may not be particularly relevant. Instead, a more relevant set of audio files 202 may include recordings of conversations between health care providers and patients. Of course, the relevance of the files 202 may be evaluated on additional, or alternative, bases as well. In general, a relatively larger set of relevant files 202 may provide better results than a relatively smaller set of relevant files 202. More generally, a statistically significant set of files 202 may be selected and processed.

The files 202 may then be transcribed to create respective transcriptions 204. In one example embodiment, the files 202 are .WAV files and may be transformed into text files, such as a file with the .txt extension. Timestamps may then be associated with each word, or groupings of words, in the text file. As the file created by conversion of an audio file may take any number of forms, one example of which is the aforementioned .txt file, such a file may be referred to generally herein as a transcription file 204, without reference or limitation to any particular type, form or format. In some embodiments, conversion of audio file speech to text may be performed by a neural network that is able to learn to recognize human speech, whether live or in an audio recording, and then convert the human speech into corresponding text. The neural network may be able to recognize human speech even in cases where the person has a speech impairment, or has a temporary condition that may affect the sound of his speech, such as a cold or the flu for example.

The set of transcription files 204 may then be processed by creating tags 206 that may then be used to label personal information in the transcription files 204. The labels may be placed in one or more portions of a transcription file 204 where personal information is mentioned. Such personal information may, or may not, be associated with a person participating in a phone call, or the person leaving a phone message. The personal information may, or may not, be articulated in the transcription file 204 by the person whom that personal information concerns.

For example, a parent may articulate information about her health, or the health of her child, to a health care provider. Thus, the person whose personal information is included in the transcription 204 may, or may not, have been a participant in the communication that was the basis for generation of the audio file 202 and corresponding transcription 204. In some embodiments, personal information concerning multiple persons may be included in a single transcription 204, such as personal information concerning joint bank account holders for example.

In some embodiments, personal information may be labeled with a tag 206 which may indicate the particular type of personal information. For example, a tag may indicate that it identifies credit card information, a home address, a bank account number, or a PIN. Information in a transcription file 204 that is not personal information may be labeled with a tag that indicates the information is not personal information. The tag creation and/or labeling processes may, or may not, be performed automatically. In some embodiments, one or more tags may be manually assigned to personal information in a transcription file 204.

B.2 Regex and ML Classifier Training

With continued reference to FIG. 2, the example training module 200 may also implement one or more functions that may help to reduce, or eliminate, the occurrence of false negative and/or false positive errors in the analysis of a transcription file 204. Some embodiments may employ a two step procedure for pattern matching.

In general, an initial step of an example two step procedure may involve a search of a transcription file 204 using one or more Regular Expressions (regex) 208. More particularly, a regex, or regexes, may be developed for each of any number of different transcription files 204. The regexes 208 may be defined so that they can be used to correctly identify matching words, data, strings, or substrings, in the training data set, that have been labeled as constituting personal information. A regex may be used to identify a 'false' condition and/or a 'positive' condition. In the false condition, the regex does not match the text of interest, and in the positive condition, the regex matches the text of interest. Thus, a regex, or group of regexes, may directly and/or inferentially identify various portions of a transcription file 204 as 'false' or 'positive.'

The regex(es) may be specific to a particular type, or types, of transcription(s). For example, one or more regexes may be developed that are specific to transcriptions concerning financial services, such as a recording of a conversation between a customer and a customer service representative at a bank or credit card company. In this example, the regex may be used to identify particular personal financial information, such as a credit card number for example, in the transcription.

In more detail, a regex may refer to a textual syntax that may be used to identify matching text, such as a word or substring for example, that conforms with the syntax specified in the regex. A regex may include one or more metacharacters and/or one or more regular characters. For example, in the regex 'y.', the 'y' is a regular character, and the '.' is a metacharacter that matches any single character except 'n.' Thus, this regex would identify any string of a transcription that included a 'y' followed by another character, such as, for example, 'yz,' 'ayb,' or 'yr.' As another example, a regex that comprises, or consists of, [a-z], would match any character in the range from 'a' to 'z.' As these examples indicate, the scope of a regex may be defined by the metacharacters and regular characters used to define the syntax of the regex. The regex [a-z] would, as noted, match any character in the range from 'a' to 'z' and, thus, is relatively broad in scope. In contrast, a regex 'a' is relatively narrow in scope in that it would only match with the string 'a.' As another example, the regex 'gr[ae]y' would match both 'gray' and 'grey.' In a final example, the regex [1234dddddddddddd] (where 'd' is a standard regex metacharacter that matches any digit character) would match any 15 digit credit card number that begins with the digits '1234.'

While one or more regexes may be manually defined, some embodiments use the training data set as a basis for automatically learning one or more regexes. One example of an algorithm for automatic generation of a regex is described in a paper entitled '*Automatic Generation of Regular Expressions from Examples with Genetic Programming*,' by Bartoli et al., GECCO '12 Companion, pages 1477-1478, July 7-11, 2012, Philadelphia, PA, USA. ACM 978-1-4503-1178-6/12/07, which is incorporated herein in its entirety by this reference.

After one or more regexes 208 have been defined, a regex may then be applied to a transcription file 204 to identify any portions of the transcription file 206 that matches the regex. Any portions of the transcription file 204 that match the regex may be identified, at least tentatively, as comprising personal information.

The next step of the example two step procedure for pattern matching may involve the use of an ML classifier 210. In general, the ML classifier 210 may be trained to infer if the text in a defined textual window is personal information or not. In more detail, the training of the ML classifier 210 may involve selection of a textual window that embraces a portion of the text of a transcription file 204. The boundaries of the textual window may correspond to respective points in time. For example, a textual window of a transcription file 204 that is 5 minutes and 37 seconds long (5:37) may begin at 2:23 and end at 3:45. In this example, the textual window spans a time period of 1:22. Any number of textual windows, of any sizes, may be defined for a transcription file 204.

The length, location, and number, of textual windows may be determined based on various considerations. For example, a textual window may be defined to begin at :15 of the transcription file 204, since the first part of the transcription file 204 may simply contain a greeting from a customer service representative to the customer. Since the greeting would be unlikely to include any personal information, there may be no need to include that portion of the transcription file 204 in a textual window. As another example, a textual window may be defined that embraces only text associated with the customer, since a customer may often be required to state her account number and/or other personal information to the customer service representative. In general then, the length, number, and location, of one or more textual windows may be varied as needed.

When the textual window(s) have been defined, the words contained in each textual window may be evaluated for personal information using various models. One example of such a model is the so-called 'bag-of-words' approach (BOW). In general, the BOW approach enables extraction of words or other strings from a textual window. The BOW approach may involve evaluating only the text itself. That is, evaluation of a ° associated elements such as the structure, or order, of text such as a word, may be omitted.

To illustrate with an example, suppose that a transcription file 204 is to be searched for a credit card number. In this case, it may not be adequate simply to search for the number, and it may be more effective to search for words that provide context. For example, a conversation may include the string from a customer service representative "please give me your credit card number," after which the transcription may include text indicating that the customer has recited his credit card number. Thus, it may be useful to search for certain words, that is a bag of words, that may be expected to appear near in time to the actual credit card number itself. In this example, the bag of words may thus include the words "credit," "card," and "number." More generally, embodiments of the invention may involve searching for words or other text strings that may occur before personal information, and/or for words or other text strings that may occur after personal information. That is, the presence in a textual window of one or more words in the bag of words may signal, or at least permit an inference, that personal information is located near in time to one or more words of the bag of words.

It is noted that some words in the bag of words may be assigned relatively more weight than other words in the bag of words. For example, the appearance of only the word "credit" may or may not signal the presence of a credit card number in a textual window. To illustrate, a customer and customer service representative may be having a general discussion about credit that does not involve the recitation of any credit card numbers. On the other hand, the appearance of the word "number" may more strongly indicate the presence of a credit card number in a textual window. Thus, a bag of words may be specified that involves a weighting scheme in which some words in the bag may be accorded relatively more weight than other words in the bag, based on a strength of correlation between the words and the personal information sought to be located. The scope of the invention is not, however, limited to use of a BOW approach or any particular approach, and various other approaches may alternatively be employed.

For example, some embodiments of the invention may use an n-gram model, where an n-gram generally refers to a contiguous sequence of 'n' items, which may or may not be words, numbers, or other strings of text elements, that may be selected from a portion of text, such as a textual window. Some particular embodiments may employ an n-gram of size 2, or size 3, for example, although the scope of the invention is not limited to any particular size(s). Thus, an example n-gram of size 3 might be: 'credit card number.' In general, one or more n-gram(s) may be applied to the text in a textual window to determine whether or not particular strings of text appear in that textual window.

Yet other embodiments of the invention may employ an approach that is sometimes referred to as 'word embedding.' In general, word embedding involves mapping words and phrases to vectors of real numbers. The space that includes the words and phrases may have many more dimensions per word than a vector space that includes the vectors. More generally, any state-of-the-art textual features may be used in connection with classification processes, examples of which are disclosed herein.

Regardless of whether an n-gram, BOW, or other, approach is used to identify text in one or more textual windows, any personal information that is identified may then be tagged with a label so indicating. When the regex development and ML training have been completed, the pattern search and mask module 300 may use the regex and ML information as a basis to identify, and mask, personal information in an audio file.

C. Processing Platform—Pattern Search and Mask Module

With continued reference to FIG. 2, details are provided concerning the example pattern search and mask module (PSMM) 300. As shown, the PSMM 300 may operate on one or more audio files 302 to create respective transcription files 304 of those audio files 302. The words, or other strings, in the transcription files 304 may each be assigned a respective timestamp. The PSMM 300 may receive, as an input, the regexes 208 that were generated by the training module 200 during the training phase. Those regexes 208 may be used by the PSMM 300 to perform a search 306 of one or more transcription files 304 for personal information.

The search 306 performed using the regexes 208 may identify one or more matches between text in the transcription file 204 and a regex 208. With respect to any such matches that may be identified between a regex and text in the transcription file 204, a threshold determination may be made that because the transcription file 204 includes text that matches a regex, the text in that transcription file 204 may be further evaluated to determine whether or not the text contains personal information.

More particularly, the ML classifier 308 may infer relevant textual windows that include the matching text. As noted elsewhere herein, a textual window may be defined that includes text preceding and/or following the matching text identified in the search 306. The ML classifier 308 may then use a BOW, n-gram, or other, approach to infer whether or not a textual window includes personal information. For any textual window that the ML classifier 308 has classified as personal, the personal information in that textual window may be masked 310 by replacing the personal information in the original audio file 302 with white noise, or otherwise processes in such a way that the personal information is made unrecognizable, and possibly unrecoverable, by human or machine.

D. Example Methods

Figure 3:
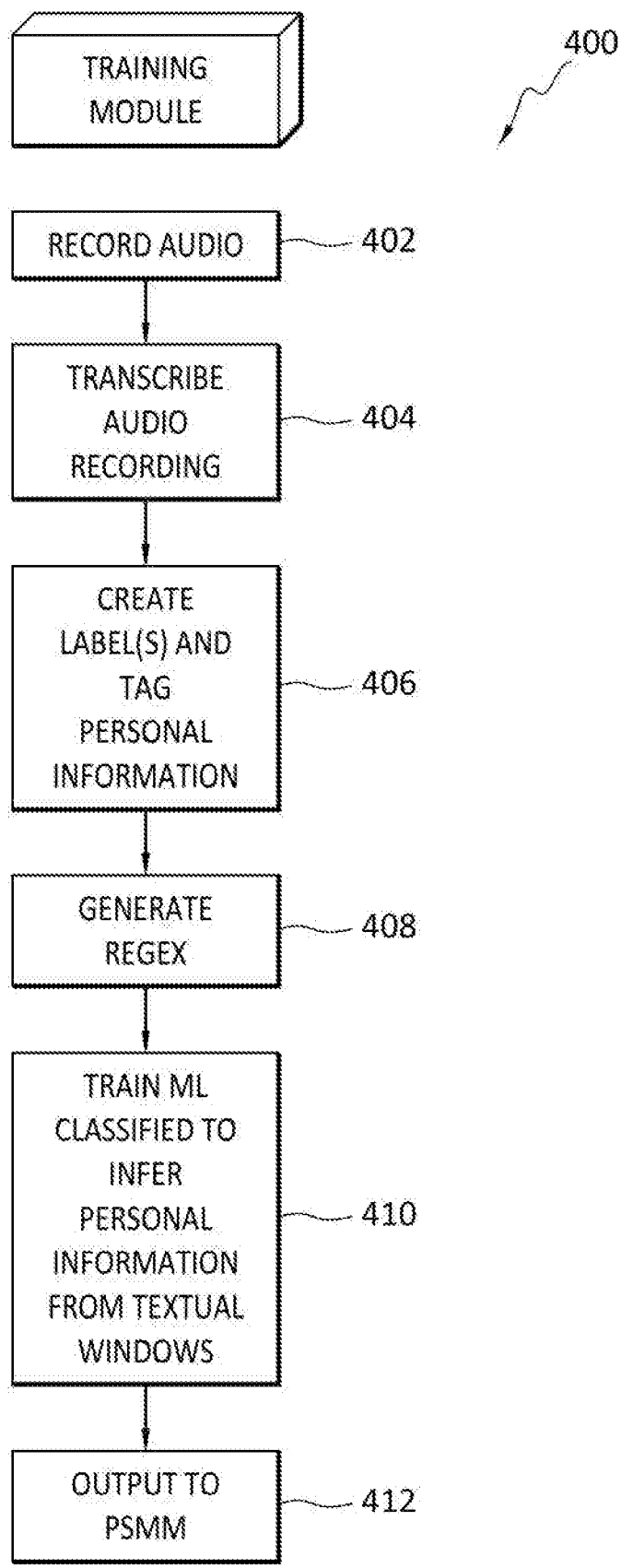
FIG. 3 discloses aspects of an example training process.

Turning next to FIG. 3, methods for developing training information for use by a PSMM are disclosed, where one example of such a method is denoted generally at 400. The method 400 may be performed in whole, or in part, by a training module, although that is not necessarily required.

The method 400 may begin at 402 where an audio recording is made of one or more words spoken by one or more humans and/or one or more machines. The audio recording may, or may not, comprise a conversation between multiple entities. In some embodiments, the audio recording may consist of words spoken by only a single entity. Further, the recording may comprise, or consist of, sounds such as tones that are created as a user enters her PIN in response to a prompt from a machine. Such a recording may, or may not, include any spoken words. The audio recording may then be transcribed 404 to create a transcription file which contains a text version of the spoken words that were recorded 402. The transcription file may be of any form, examples of which include digital forms such as .docx files and .txt files.

The transcription file may then be processed 406 by creating tags that may then be used to label personal information in the transcription file. The labels may be placed in one or more portions of a transcription file where personal information is mentioned. Next, one or more regexes may be defined 408 that, when applied to the text in the transcription file, may correctly identify the information that has been labeled as personal information. In some embodiments, the regexes may be defined 408 automatically, rather than manually by a human user, although neither approach is required.

An ML classifier may then be trained 410 to infer the presence of personal information from one or more textual windows. The textual windows may be defined by the ML classifier based on the presence of the personal information. That is, the textual windows may be defined so as to embrace within their respective timeframe the occurrences of information that has been labeled as personal information. From these textual windows, the ML classifier may thus be trained 410 to infer that personal information is present in the textual windows. Finally, the learned regexes may be output 412 to a PSSM.

Figure 4:
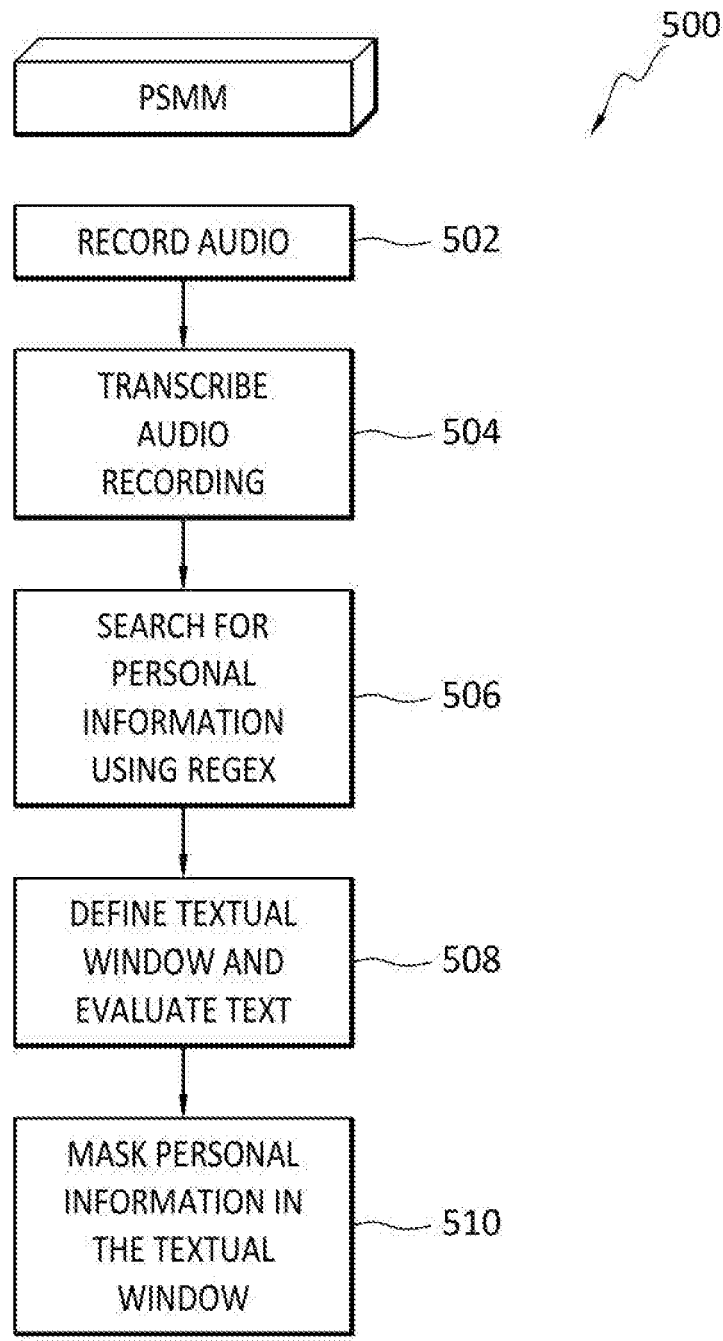
FIG. 4 discloses aspects of an example pattern search and masking process.

Turning next to FIG. 4, methods for masking personal information in an audio recording are disclosed, where one example of such a method is denoted generally at 500. Processes 502 and 504 may be similar, or identical, to processes 402 and 404, respectively, and so are not addressed in further detail here. The method 500 may be performed in whole, or in part, by a PSMM, although that is not necessarily required.

After transcription 504 is complete, or while transcription 504 is ongoing, a transcription file, or a portion of a transcription file, may be searched 506 for personal information using one or more regexes. One or more textual windows may be defined 508 that include matching text identified during the search 506. A trained ML classifier, for example, may then evaluate 508 the text in the textual windows by inferring whether or not that text constitutes personal information.

When personal information has been identified as being present in a textual window, that information may then be masked 510. The masking 510 may render the personal information unrecognizable, and unrecoverable, by a human or a machine such as a computing entity. In this way, a participant in a phone call, for example, may be assured that any personal information included in an audio file, such as a recording of the phone call, will not be accessible to unauthorized parties.

E. Further Example Embodiments

Following are some further example embodiments of the invention. These are presented only by way of example and are not intended to limit the scope of the invention in any way.

Embodiment 1. A method, comprising: creating a recording that includes an audio component; transcribing a portion of the audio component to create a transcription file that includes text; searching the text of the transcription file and identifying information in the text that may comprise personal information; defining a textual window that includes the information; evaluating the text in the textual window to identify personal information; and masking the personal information in the audio component of the recording.

Embodiment 2. The method as recited in embodiment 1, wherein the audio component includes words spoken by a human.

Embodiment 3. The method as recited in any of embodiments 1-2, wherein the recording is an audio recording, or an audio/video recording.

Embodiment 4. The method as recited in any of embodiments 1-3, wherein identification of information in the text that may comprise personal information is performed using one or more regexes.

Embodiment 5. The method as recited in any of embodiments 1-4, wherein defining a textual window comprises defining a portion of the recording that is bounded by a start time and an end time, and that includes text that occurs prior in time and/or later in time than the personal information.

Embodiment 6. The method as recited in any of embodiments 1-5, wherein evaluating the text in the textual window to identify personal information comprises inferring that some of the text comprises personal information.

Embodiment 7. The method as recited in embodiment 6, wherein inferring that some of the text is personal information comprises applying a bag-of-words analysis or n-gram analysis to the text.

Embodiment 8. The method as recited in any of embodiments 1-7, wherein masking the personal information comprises replacing the personal information with data of a non-personal nature.

Embodiment 9. The method as recited in any of embodiments 1-8, further comprising generating a set of training data and using the training data as a basis for searching the text of the transcription file.

Embodiment 10. The method as recited in embodiment 9, wherein generating the set of training data comprises: tagging data in the training data as comprising personal information; automatically learning one or more regexes; and training a machine learning classifier to infer whether or not text in a textual window comprises personal information.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
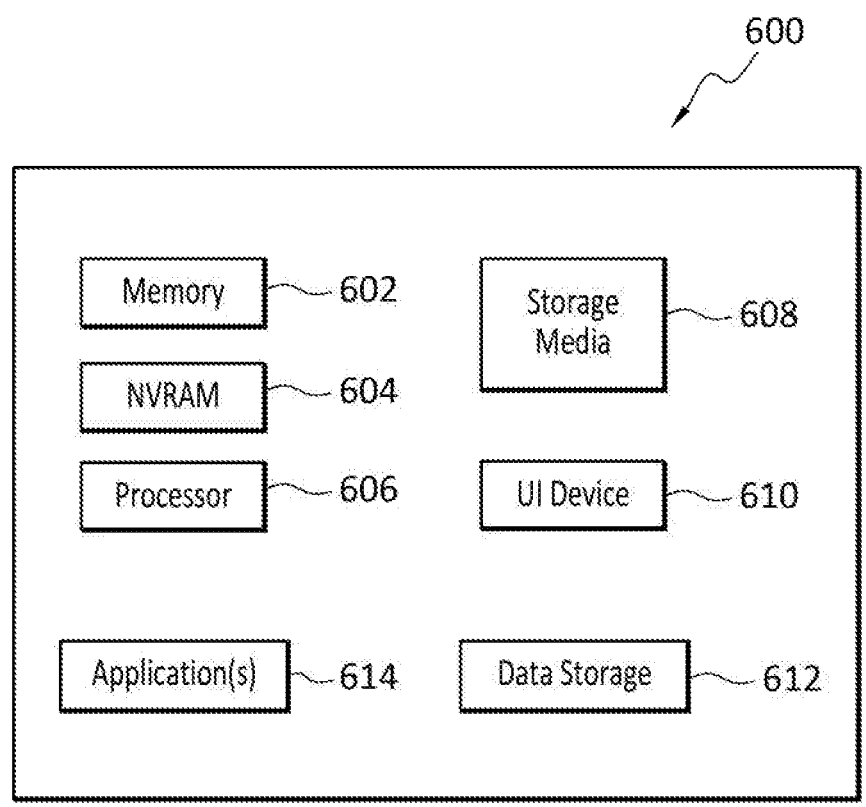
FIG. 5 discloses aspects of an example computing entity.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 5.

In the example of FIG. 5, the physical computing device 600 includes a memory 602 which may include one, some, or all, of random access memory (RAM), non-volatile memory (NVM) such as random access memory (NVRAM) 604, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
creating a recording that includes an audio component of a client;
transcribing a portion of the audio component to create a transcription file;
receiving a regex;
using the regex to search for a matching text between a portion of the transcription file and the regex;
identifying one or more textual windows that include the matching text in the transcription file, wherein each identified textual window includes text preceding and following the matching text, and each identified textual window includes only text associated with the client;
evaluating, by a trained machine learning classifier, the text in each identified textual window based on a bag of words model, in which a word in a bag of words has a relatively higher weight than other words in the bag of words based on a strength of correlation between words and personal information sought to be located;
inferring, based on the evaluating of the text in each identified textual window, presence of personal information of the client in each identified textual window; and
removing the personal information from any identified textual window in which presence of the personal information was inferred.

2. The method as recited in claim 1, wherein the audio component includes words spoken by a human.

3. The method as recited in claim 1, wherein the recording is an audio recording, or an audio/video recording.

4. The method as recited in claim 1, wherein the trained machine learning classifier maps words in the one or more identified textual windows as a vector of real numbers, and the vector is one of a group of vectors in a vector space.

5. The method as recited in claim 1, wherein each textual window comprises a portion of the recording that is bounded by a start time and an end time.

6. The method as recited in claim 1, wherein the method is performed on-the-fly as the recording is being created.

7. The method as recited in claim 1, wherein the personal information does not pertain to any person whose voice is in the recording.

8. The method as recited in claim 1, wherein the removed personal information is replaced with data of a non-personal nature.

9. The method as recited in claim 1, further comprising generating a set of training data and using the training data as a basis for searching the text of the transcription file.

10. The method as recited in claim 9, wherein generating the set of training data comprises:
tagging data in the training data as comprising the personal information;
automatically learning one or more regexes, including the regex; and
training a machine learning classifier to infer presence of the personal information in the identified textual window.

11. A non-transitory storage medium having stored therein instructions that are executable by one or more hardware processors to perform operations comprising:
creating a recording that includes an audio component of a client;
transcribing a portion of the audio component to create a transcription file;
receiving a regex;
using the regex to search for a matching text between a portion of the transcription file and the regex;
identifying one or more textual windows that include the matching text in the transcription file, wherein each identified textual window includes text preceding and following the matching text, and each identified textual window includes only text associated with the client;
evaluating, by a trained machine learning classifier, the text in each textual window based on a bag of words model, in which a word in a bag of words has a relatively higher weight than other words in the bag of words based on a strength of correlation between words and personal information sought to be located;
inferring, based on the evaluating of the text in each identified textual window, presence of personal information in each textual window; and
removing the personal information of the client from any identified textual window in which presence of the personal information was inferred.

12. The non-transitory storage medium as recited in claim 11, wherein the audio component includes words spoken by a human.

13. The non-transitory storage medium as recited in claim 11, wherein the recording is an audio recording, or an audio/video recording.

14. The non-transitory storage medium as recited in claim 11, wherein the trained machine learning classifier maps words in the one or more identified textual windows as a vector of real numbers, and the vector is one of a group of vectors in a vector space.

15. The non-transitory storage medium as recited in claim 11, wherein each textual window comprises a portion of the recording that is bounded by a start time and an end time.

16. The non-transitory storage medium as recited in claim 11, wherein the operations are performed on-the-fly as the recording is being created.

17. The non-transitory storage medium as recited in claim 11, wherein the personal information does not pertain to any person whose voice is in the recording.

18. The non-transitory storage medium as recited in claim 11, wherein the removed personal information is replaced with data of a non-personal nature.

19. The non-transitory storage medium as recited in claim 11, further comprising generating a set of training data and using the training data as a basis for searching the text of the transcription file.

20. The non-transitory storage medium as recited in claim 19, wherein generating the set of training data comprises:
tagging data in the training data as comprising the personal information;
automatically learning one or more regexes, including the regex; and
training a machine learning classifier to infer presence of the personal information in the identified textual window.

* * * * *